US008624178B2

(12) United States Patent
Chamming's

(10) Patent No.: US 8,624,178 B2
(45) Date of Patent: Jan. 7, 2014

(54) METHOD OF CORRECTING SENSITIVITY AND MATRIX IMAGE SENSOR FOR IMPLEMENTING THIS METHOD

(75) Inventor: Gilles Chamming's, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 329 days.

(21) Appl. No.: 12/672,933

(22) PCT Filed: Jul. 28, 2008

(86) PCT No.: PCT/EP2008/059893
§ 371 (c)(1),
(2), (4) Date: Apr. 16, 2012

(87) PCT Pub. No.: WO2009/021833
PCT Pub. Date: Feb. 19, 2009

(65) Prior Publication Data
US 2012/0205529 A1  Aug. 16, 2012

(30) Foreign Application Priority Data

Aug. 10, 2007  (FR) ...................................... 07 05824

(51) Int. Cl.
*G12B 13/00* (2006.01)
(52) U.S. Cl.
USPC .................................................. 250/252.1
(58) Field of Classification Search
CPC ....... G01D 18/00; G12B 13/00; G01J 1/0295; G01J 2001/444; G01J 2001/1684; G01J 2001/4406; G01J 2001/4426; G01J 2005/0048
USPC .................................................. 250/252.1
See application file for complete search history.

(56) References Cited

U.S. PATENT DOCUMENTS

| 5,047,861 | A | 9/1991 | Houchin et al. |
| 5,756,999 | A | 5/1998 | Parrish et al. |
| 7,470,902 | B1 * | 12/2008 | Kraemer et al. ............... 250/330 |

FOREIGN PATENT DOCUMENTS

| EP | 1601185 | 11/2005 |
| GB | 2296147 | 6/1996 |

* cited by examiner

*Primary Examiner* — David Porta
*Assistant Examiner* — Edwin Gunberg
(74) *Attorney, Agent, or Firm* — LaRiviere, Grubman & Payne, LLP

(57) ABSTRACT

The invention relates to matrix image sensors, and more particularly to a method for correcting the spatial noise caused by the dispersion of the physical properties of the various pixels of the matrix. According to the invention, a signal $X_i(L)$ is established pixel by pixel that corresponds to the illumination of a pixel $P_i$ by a luminance L; a fixed reference $K_0$ is defined for this signal, the value $K_0$ being chosen such that, for a given luminance $L_0$, the pixels all supply an identical signal $X_i(L_0)$ that is equal to $K_0$; and a corrected signal $X^*_i(L)$ is established by applying to the duly referenced signal $X_i(L)-K_0$ a multiplying correcting coefficient specific to the pixel concerned, the correcting coefficient being determined from the signal $X_i(Lr)$ supplied by the pixel $P_i$ for a determined reference luminance Lr which is the same for all the pixels. The correcting coefficient is preferably stored in an initialization register REG1 specific to the pixel, which contains a value $dT_i$ for modulating the integration time of a counting frequency representing the luminance.

19 Claims, 4 Drawing Sheets

METHOD OF CORRECTING SENSITIVITY AND MATRIX IMAGE SENSOR FOR IMPLEMENTING THIS METHOD

PRIORITY CLAIM

This application claims priority to PCT Patent Application Number PCT/EP2008/059893, entitled Method of Correcting Sensitivity and Matrix Image Sensor for Implementing This Method, filed Jul. 28, 2008, also claiming priority to FR 07 05284, filed Aug. 10, 2007.

FIELD OF THE INVENTION

The invention relates to matrix image sensors, and it more particularly relates to a method for correcting the spatial noise caused by the dispersion of the physical properties of the various individual sensitive dots, or pixels, of the matrix. This spatial noise is particularly great in the case of infrared image sensors, regardless of whether they are photovoltaic cell sensors, which measure currents generated by infrared radiation, or bolometric element sensors, which measure a temperature resulting from a heating produced by the radiation.

BACKGROUND OF THE INVENTION

The spatial noise generates a spurious image which degrades the useful image or even renders it unusable: assuming that the scene observed by the sensor is an image of uniformly average luminance, the sensor supplies a non-uniform image, which is unacceptable if this non-uniformity exceeds a certain degree; furthermore, the observed image depends on the level of this uniform luminance, which renders this noise that much more of a nuisance when the behavior difference of two pixels depends on the luminance that they receive.

The behavior of the pixels differs in fact from one pixel to another not only with regard to the signal level produced for a reference luminance level, but also with regard to the growth gradient of the response curve of the pixel according to the luminance.

To minimize the spatial noise generated in this way in a matrix sensor, it has already been proposed to measure the output signal levels of the different pixels for a uniform image of given luminance and to individually shift the signal level of each pixel so that all the pixels are brought to one and the same reference (first order correction). It has also been proposed to record the levels for two different uniform luminance levels, in order to correct not only the level shift but also the variation gradient (second order correction).

To correct both the level and the gradient, after having measured the signals obtained from each pixel for two different uniform luminances, it is possible, for example, to proceed as follows:

in the first step, a correction is made which brings the level of the signal to one and the same value that is common to all the pixels for one of the uniform illumination levels, a value that can be considered to be a reference value;

in the second step, after having shifted the signal level of each pixel by a value specific to this pixel, a gain correction is carried out so that the variation gradient around the reference value of the corrected signal is the same for all the pixels; for each pixel, the difference between the corrected signals obtained for the two luminances is calculated, and, for each pixel, a gain is determined such that this difference multiplied by the gain is equal to a value common to all the pixels; a correction is then made for each pixel which consists in multiplying the difference between the corrected signal level and the reference value by the gain specific to this pixel; this gives a doubly-corrected signal that is added to the common reference value to obtain the final signal.

These methods therefore require in practice, to take into account the level dispersion and to take into account the gain dispersion, a manual calibration based on one or two uniform images presenting reference luminances, which is problematic; moreover, this calibration must be redone if the spatial noise drifts over time.

It has also been proposed to make corrective calculations for each of the dots of the collected image, based on the observation of a large number of successive images, by assuming that the statistical average and the statistical variance of the light levels received by a pixel is the same for all the pixels because of the diversity of the images received over time. Thus, the average is calculated of the signals received over time for each pixel and the current signal from the pixel is corrected to shift the current level by a value corresponding to the difference between the average detected for this pixel and a reference average value common to all the pixels. This brings the average level of all the signals to one and the same reference value, this reference value being derived from a statistical average and not from the observation of a screen of reference uniform luminance.

Similarly, the variance is calculated for each pixel over a large number of images, this variance in a way representing an approximation of the gradient of the variation curve of the signal level according to the luminance, and a gain correction is applied to the current signal variations, the correction being the difference between the calculated variance and a reference variance common to all the pixels. The reference variance can be an average of the variances of all the pixels. This brings the variation gradient of each pixel to one and the same reference value.

This solution is highly advantageous since it requires no calibration from reference screens.

However these calculations are very intensive since they require a large number of images to be collected, all of them to be stored, average calculations to be made for each pixel over this large number of images, and variance calculations on each pixel. In practice, this can be done only by a powerful computer, on prestored series of images. It would not be possible to collect and directly process the image in the shot-taking camera. Consequently, although this solution can be used in theory to process pre-recorded images, it is not at all applicable for taking instantaneous images.

In a certain number of image sensors, the dispersion of the signal levels for a given average luminance proves to be much greater than the dispersion due to the gradient variance over the entire possible luminance scale. Typically, if the amplitude of the signal variations within the range of useful luminances gives rise to a signal dispersion from pixel to pixel of the order of an eighth of this amplitude, the dispersion of the average amplitude of the signal, from pixel to pixel, can be as high as eight times the amplitude of the variations in the useful range. This also results from the fact that the signal variations obtained from the pixel, within the range of luminances that can be received, often do not exceed 1 to 2 percent of the average level of the electrical signal supplied by the pixel. It is therefore particularly crucial in these sensors to correct the dispersion of the response levels.

However, it has been seen that, for a certain number of image sensors that have a very high level dispersion, the dispersion of the variation gradients from one pixel to another is correlated with the dispersion of the average signal levels for a given luminance: in practice, the variation gradient of the output signal according to the luminance is greater if the level for an average luminance is higher. This results from the physical construction of these image sensors. Such is the case in particular for bolometric-type infrared sensors.

SUMMARY OF THE INVENTION

According to the invention, it is proposed to considerably simplify the image sensor calibration process, by a priori considering that the variation curves of the signal level according to the luminance, in a useful luminance range, can be approximately represented by straight lines passing through one and the same origin point for all the pixels, so that the electrical signal (voltage or current or quantity of charges) output by a pixel $P_i$ can be expressed $X_i(L)=K_0+G_i(L-L_0)$; L is a parameter linked to the received illumination, and this parameter is designated by "luminance" hereinafter in the interests of simplification; $X_i(L)$ is the signal value supplied by the pixel $P_i$ for a luminance L; $L_0$ is a luminance at the point where all the straight lines cross, $K_0$ is the electrical signal value obtained from this pixel for the luminance $L_0$, and $G_i$ is the variation gradient of the signal according to the luminance for the pixel $P_i$.

Consequently, according to the invention, there is proposed a method of correcting the electrical signal obtained from each pixel, related to a reference represented by the dot ($K_0$, $L_0$), by multiplying it simply by a coefficient representing the ratio between the gradient $G_i$ corresponding to this pixel and a reference gradient $G_0$ which is the same for all the pixels. With this simple application of a multiplying coefficient, but by using a signal referenced relative to an origin common to all the pixels, a dispersion correction is obtained that is highly effective without requiring the use of an additive and multiplicative double correction.

The reference gradient can be an average of the gradients observed over all the pixels, or else a desired arbitrary gradient.

More specifically, the inventive method is a method of correcting sensitivity for a matrix image sensor, characterized in that it comprises the following steps:

a signal $X_i(L)$ is established pixel by pixel that corresponds to the illumination of a pixel $P_i$ by a luminance L;

a fixed reference $K_0$ is defined for this signal, the value $K_0$ being chosen such that, for a given luminance $L_0$ the pixels all supply a signal $X_i(L_0)$ substantially equal to $K_0$;

and a corrected signal $X^*_i(L)$ is established by applying to the duly referenced signal $X_i(L)-K_0$ a multiplying correcting coefficient specific to the pixel concerned and by adding $K_0$ to the result of the multiplication, the correcting coefficient being determined from the signal $X_i(Lr)$ supplied by the pixel $P_i$ for a determined reference luminance Lr which is the same for all the pixels.

The multiplying correcting coefficient is preferably equal to $[X_0(Lr)-K_0]/[X_i(Lr)-K_0]$, in which $X_0(Lr)$ is a desired value for the corrected signal obtained from a pixel when it is illuminated by the reference luminance Lr.

The signal $X_i(L)$ is preferably the temporal integral of an electrical current value that becomes all the greater as the luminance increases. The integration time is renewed on each integration cycle as successive images are taken. The multiplying correcting coefficient specific to each pixel is then applied in the form of an integration time of this current that differs from one pixel to another.

In one embodiment, each pixel of the matrix sensor comprises a light-sensitive element supplying a current that varies according to the illumination, a current-frequency conversion element producing pulses with a frequency that varies according to the current, and a pulse counter actuated during said integration time, the multiplying correcting coefficient being the ratio between this time and a fixed time $T_0$.

The variable integration time specific to a pixel can be defined by a recursive method based on a register specific to the pixel, the content of this register being incremented by a value $X^*_i(L)/2^p$ on each integration cycle, p being an integer number at least equal to 8 and preferably chosen between 12 and 14, the corrected value $X^*_i(L)$ being able to assume positive or negative values around a zero value corresponding to the average of the luminances received by the pixels over a long time period. This recursive method relies on the fact that all the pixels will statistically receive one and the same average luminance if they observe variable images for a long enough time (typically several minutes, but this time depends on greater or lesser variety of images seen by the sensor). It also relies on the fact that, by slightly modifying, positively or negatively, the content of the register according to the received luminance, this content will gradually be stabilized (with a time constant it becomes all the greater as p increases) around a value such that the average of the corrected signals will be zero for this pixel and for the others.

The register of a pixel $P_i$ preferably contains a value $dT_i$ used to initialize a counter which determines an integration time by counting at a fixed frequency up to a predetermined content. The integration time is then equal to a fixed time ($T_0$) minus the content ($dT_i$) of the register.

Generally, the multiplying correcting coefficient can also be established by a calculation, regardless of the construction of the pixel, in a calibration phase during which the matrix is illuminated by a light source of luminance Lr that is uniform for all the pixels. The signal $X_i(Lr)$ is measured for all the pixels, and the multiplying coefficient that is correct for bringing the response curves of all the pixels to one and the same reference curve is calculated. The calculation is preferably made outside the pixel matrix, and is transmitted by a bus to the pixels (for example a bus that fills a register for modulating the integration time that is specific to each pixel).

The invention applies to bolometric-type infrared image sensors, but also more generally to any matrix image sensor whose operating principle means that all the pixels have response curve shapes that are similar to one another and almost all passing through an origin common to all the pixels.

BRIEF DESCRIPTION OF THE DRAWINGS

Other characteristics and advantages of the invention will become apparent from reading the detailed description that follows and that is given with reference to the appended drawings in which.

DESCRIPTION OF PREFERRED EMBODIMENTS

Figure 1:
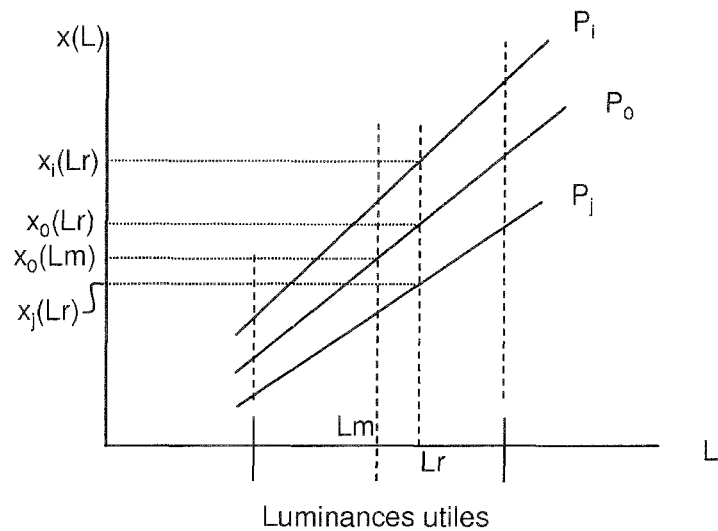
FIG. 1 represents linear response curves for different pixels of one and the same pixel matrix, within a range of useful luminances around an average luminance value Lm.

FIG. 1 is a diagram diagrammatically representing the dispersion of the individual responses of the pixels of a matrix sensor exposed to a variable luminance L within a range of useful luminances given the planned application. As stated previously, the parameter L is designated by the word "luminance", but it can be different from luminance. In all cases it represents the greater or lesser exposure of a pixel to a more or less intense light.

The responses of three pixels are represented: a pixel $P_i$, a pixel $P_j$ and a pixel $P_0$. The pixel $P_i$ is the most sensitive of the three, in that it supplies an electrical signal $x_i(L)$ which is greater than the others for a given luminance: for a reference luminance Lr (which could also be an average luminance Lm roughly in the middle of the useful range), it supplies a signal $x_i(Lr)$ of an amplitude that is higher than the signals supplied by the others for the same reference luminance; the pixel $P_j$ is the least sensitive of the three and supplies a signal $x_j(Lr)$ less than $x_i(Lr)$ for the same luminance Lr; the pixel $P_0$ has an intermediate sensitivity, neither too great nor too weak, that can be taken as a reference for assessing the sensitivity of the other pixels; it supplies a signal $x_0(Lr)$ when exposed to the luminance Lr.

In the case of FIG. 1, the responses of the different pixels can be considered to be substantially linear around their average value; we will see later what happens if they are not linear. The gradients of these responses are, however, different from one pixel to another, and it is this that would, in the prior art, justify establishing a double correction to bring all the pixels to one and the same response curve: a correction that is firstly additive to lower, by a value $x_i(Lr)-x_0(Lr)$, the level of the signal obtained from the most sensitive pixel $P_i$ and to raise, by a value $x_0(Lr)-x_j(Lr)$, the level of the signal obtained from the least sensitive pixel $P_j$; then a multiplying correction is made to give the pixel $P_i$ a response gradient that is weaker with luminance variations, and a stronger gradient for the pixel $P_j$; the gradients are brought to a reference value that can be the gradient of the pixel of average sensitivity $P_0$ or, more generally, a desired reference gradient.

If the sensor is a bolometric sensor, it can be seen that there is a correlation between the difference in the response levels for the reference luminance, $x_i(Lr)$, $x_j(Lr)$, $x_0(Lr)$, and the different response gradients from one pixel to another: the pixel $P_i$ considered to be the most sensitive because it supplies a signal $x_i(Lr)$ that is stronger for the reference luminance Lr also has the greatest response curve gradient; the least sensitive pixel $P_j$ has the lowest response curve gradient.

For the bolometric infrared sensors, but also for other types of sensors, everything happens as if the responses of the individual pixels of the matrix were all straight lines passing roughly through one and the same origin O.

Figure 2:
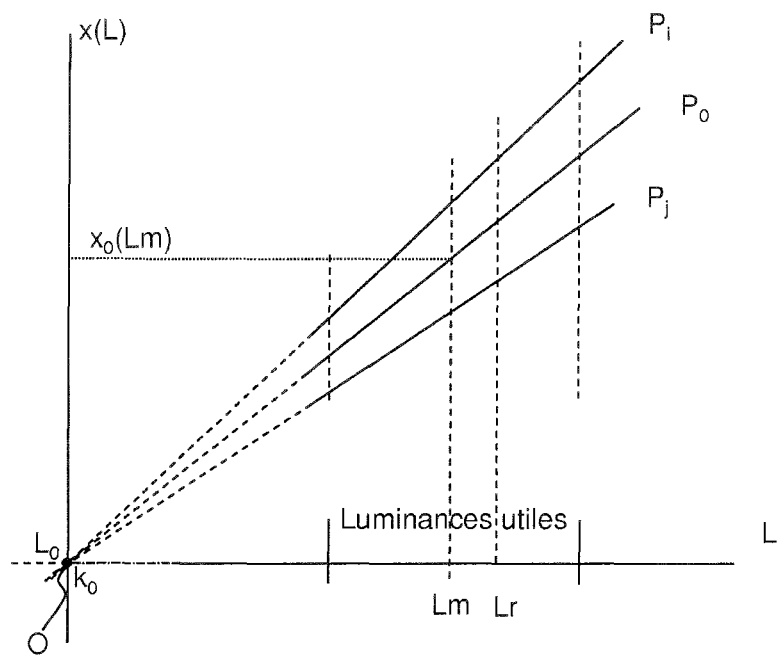
FIG. 2 represents the same curves, showing a point of convergence of the x axis $L_0$ and the y axis $k_0$ of all these response curves.

FIG. 2 represents the same response curves, showing this common origin point O. This common origin is explained more often than not by the very construction of the pixels: it is possible to conceive, for example, that the pixels truly supply no useful signal when they are completely dark, or even that they supply a leakage current that is strictly identical for all when they are dark, etc.

Because of this common origin of the response curves, it will be understood that the response of a pixel $P_i$ or $P_j$ can be modified, and it can be brought to the response of the reference pixel $P_0$ simply by multiplying, by a multiplying corrective factor $FC_i$ or $FC_j$, the signal obtained from the pixel $P_i$ or $P_j$, provided that the point O (x axis $L_0$, y axis $k_0$) is taken as the origin of the signal values obtained from the pixels. Thus, the signal $x_i(L)$ supplied by the pixel $P_i$ for a luminance L will be corrected by multiplying $x_i(L)-k_0$ by a correction factor $FC_i=G_0/G_i$, in which $G_0$ represents the gradient of the response of the reference pixel and $G_i$ the gradient of the response of the pixel concerned; this multiplying correction will give a corrected signal $x^*_i(L)$ such that $x^*_i(L)-k_0=[x_i(L)-k_0].G_0/G_i$, or $x^*_i(L)=[x_i(L)-k_0].G_0/G_i+k_0$.

In practice, it can be considered, both in analog processing and in digital processing, that the signal obtained from the pixels is centered relative to the signal obtained from the reference pixel for an average luminance Lm. In other words: each pixel can supply an analog or digital electrical signal that is either positive or negative around a zero value which is the response of a reference pixel to the average luminance (Lm). It is therefore possible to change the representation coordinates of the response and consider a y axis of the responses of which the zero is this response.

Consequently, hereinafter, it will not be the signals $x_i(L)$ that will be considered, which are referenced relative to x- and y-axis origins $L_0$ and $k_0$, but shift signals $X_i(L)$ that are referenced relative to an x-axis Lm and y-axis $x_0(Lm)$ point.

$$X_i(L)=x_i(L)-x_0(Lm).$$

Similarly, a new origin value $K_0$ of the point O will be defined relative to this new reference:

$$K_0=k_0-x_0(Lm)$$

Figure 3:
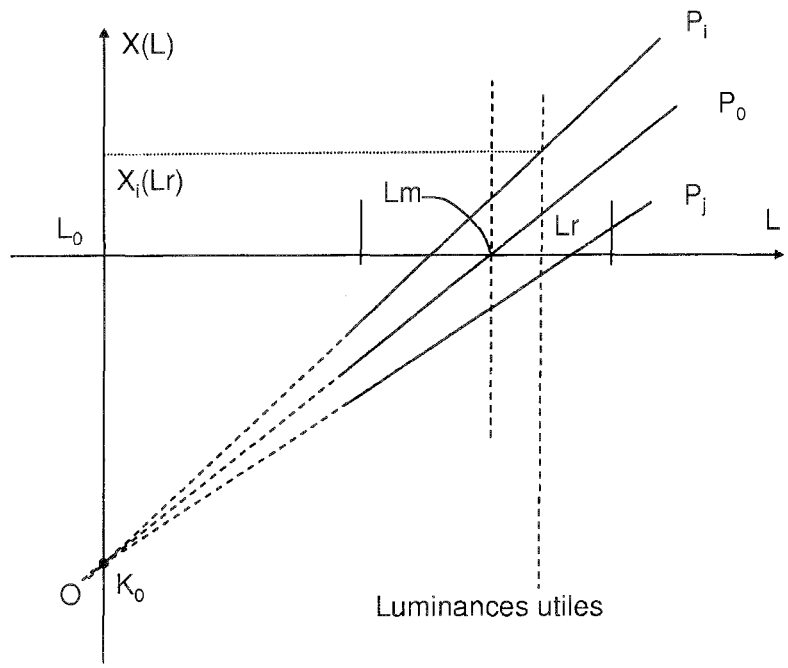
FIG. 3 represents the same curves, brought to a y axis corresponding to the signal value obtained for an average luminance Lm and reference pixel $P_0$.

FIG. 3 represents the signals referenced in this way relative to the response of a reference pixel $P_0$ to an average luminance Lm.

From these shift signals, corrected signals $X^*_i(L)$ will be obtained that are also referenced relative to the x-axis point Lm and y-axis point $x(L)=x_0(Lm)$, or $X(L)=0$.

The correction to be applied to the signals $X_i(L)$ then remains the same as previously, by using value $K_0$ instead of $k_0$:

$$X^*_i(L)-K_0=[X_i(L)-K_0].FC_i,$$

with a correction factor $FC_i=G_0/G_i$;

FIG. 3 represents the variations of signals X(L) relative to these new references.

The ratio of the gradients $G_0/G_i$ can be measured from the knowledge of the response of each pixel (and of the reference pixel) for the reference luminance Lr.

In practice, the response of the pixel $P_i$ to the luminance Lr is $X_i(Lr)$ such that $X_i(Lr)-K_0=G_i.(Lr-L_0)$; the response of the reference pixel $P_0$ to this same luminance is $X_0(L)$ such that $X_0(Lr)-K_0=G_0.(Lr-L_0)$.

The correction factor $FC_i=G_0/G_i$ is therefore equal to $[X_0(Lr)-K_0]/[X_i(Lr)-K_0]$.

Determining this gain ratio consequently presupposes measuring $X_i(Lr)$ and knowing $K_0$, and the correction factor is $G_0/G_i=[X_0(Lr)-K_0]/[X_i(Lr)-K_0]$.

$K_0$ may be known because of the physical construction of the pixels of the sensor and of the signal processing operations that take place between the pixel itself and the output electrical signal X(L) concerned, regardless of whether it is analog or digital.

If $K_0$ is unknown, it is also possible to estimate it, and possibly adjust it by successive approximations (this can be done by the observation of images taken by the sensor).

The reference pixel $P_0$ is not a pixel that is physically present on the sensor: what counts is the value $X_0(Lr)$, and a desired value $X_0(Lr)$ can be chosen which is that relative to which all the pixels of the matrix are desired to be referenced. This value $X_0(Lr)$ can also be obtained by measurement, by calculating the average of the responses of all the pixels of the matrix illuminated by the uniform luminance Lr, and by then taking this value as reference zero of X(L). It will be seen that, in some cases, it is not even necessary to calculate this reference.

Thus, knowing $K_0$ and the correction factor $FC_i$ determined for each pixel, it is possible to systematically replace the measured electrical signal $X_i(L)$ obtained from a pixel $P_i$ with a corrected signal $X^*_i(L)=K_0+FC_i \cdot [X_i(L)-K_0]$, in which $FC_i$ is $$FC_i = [X_0(Lr)-K_0]/[X_i(Lr)-K_0]$$

There is only one multiplying correction given that the additions of $K_0$ are additions of a fixed quantity that does not vary from pixel to pixel. Only the multiplying correcting term varies from pixel to pixel.

The inventive method therefore comprises two main steps:
  searching for the individual correction factors $FC_i$ of the pixels, according to the above formula, the term $K_0$ being estimated or known,
  multiplying the individual measurement signals from the pixels, referenced relative to the value $K_0$, by the correction factor $FC_i$ relative to each pixel.

In the usual context of conventional correction (additive and multiplicative), it would be necessary to use a computer external to the sensor and even to the shot-taking camera. It is possible to do that here also, but it is possible advantageously to use a calculation internal to the sensor or to the camera, because of the fact that the simple multiplicative correction is easier to implement than a double correction.

If the multiplication is integrated in the sensor, it can be particularly advantageous to provide an individual calculation circuit associated with each pixel (integrated in the pixel or produced in a correction matrix associated with the pixel matrix), or even to provide other means producing, at the level of each pixel, an operation equivalent to a multiplication by the factor $FC_i$. An operation equivalent to this multiplication can be done, even in analog mode, for example by adjusting a voltage or a bias current whose value acts on the sensitivity of the pixel. The current or the voltage is then individually adjusted for each pixel so as to make the desired correction.

Figure 4:
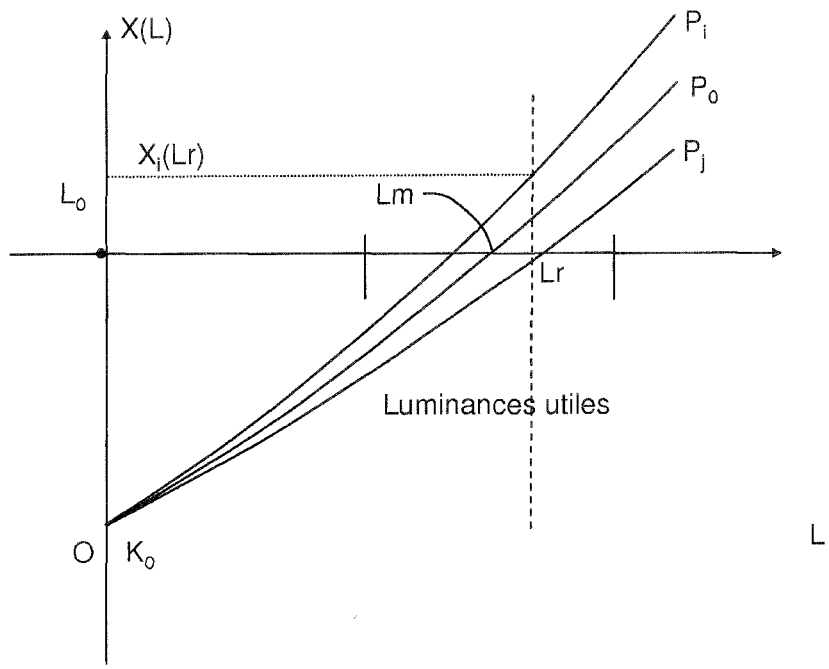
FIG. 4 represents response curves similar to the previous ones, but nonlinear.

It will be noted that the simplifying hypothesis has been made hereinabove that the output signal from the pixel varies linearly with the luminance. The invention can, however, be implemented even if there are nonlinearities, provided that it is also possible to consider that the nonlinear response curves of the different pixels pass roughly through a common origin point O and that it is possible to switch from one curve to another by a simple multiplication of the signal (referenced relative to the point O) by a multiplying factor within the range of luminances concerned; this means that the nonlinearity is the same for all the pixels by construction, which is normal since all the pixels are a priori produced in the same way, only the technological dispersions giving them different responses represented by a multiplying factor specific to each pixel. FIG. 4 illustrates nonlinear response curves that satisfy this condition. It will be understood that it is then possible to reason, as for the preceding figures, using a simple operation involving multiplying the signal obtained from the pixel with the same multiplying coefficient as the one given above.

In the case where implementing the multiplying correction according to the invention is done upstream of the transmission of the electrical signal from the pixel at the output of the matrix (that is to say that the correction is integrated in each pixel), it is possible to proceed as follows: the exposure time of each pixel is individually adjusted to a time that varies from one pixel to another. The less sensitive pixels will have a longer exposure time (within the limit of the usual posing time of 20 milliseconds for a conventional imager), the more sensitive pixels will have a shorter exposure time. An individual counter counting pulses at a fixed frequency can be provided for this purpose in each pixel to define the posing time: the counter will be associated with an initialization register that imposes on it a predetermined content on startup, the counter then counting up to the maximum of its capacity, with the result that the counting time for a given charge integration cycle varies from one pixel to another according to the content of the initialization register; the variation from one pixel to another represents the integration time reduction necessary to compensate for the differences between the sensitivities of the individual pixels. The content of the register will be established pixel by pixel according to the determined multiplying factor that must be applied to this pixel to bring it to the behavior of a reference pixel. If the maximum exposure time is $T_0$ and the content of the register is $dT_i$, the multiplying coefficient is basically $(T_0-dT_i)/T_0$. The reference pixel in this case is the pixel of weakest sensitivity, the one that has a maximum exposure time $T_0$ and a nil register content $dT_i$.

Figure 5:
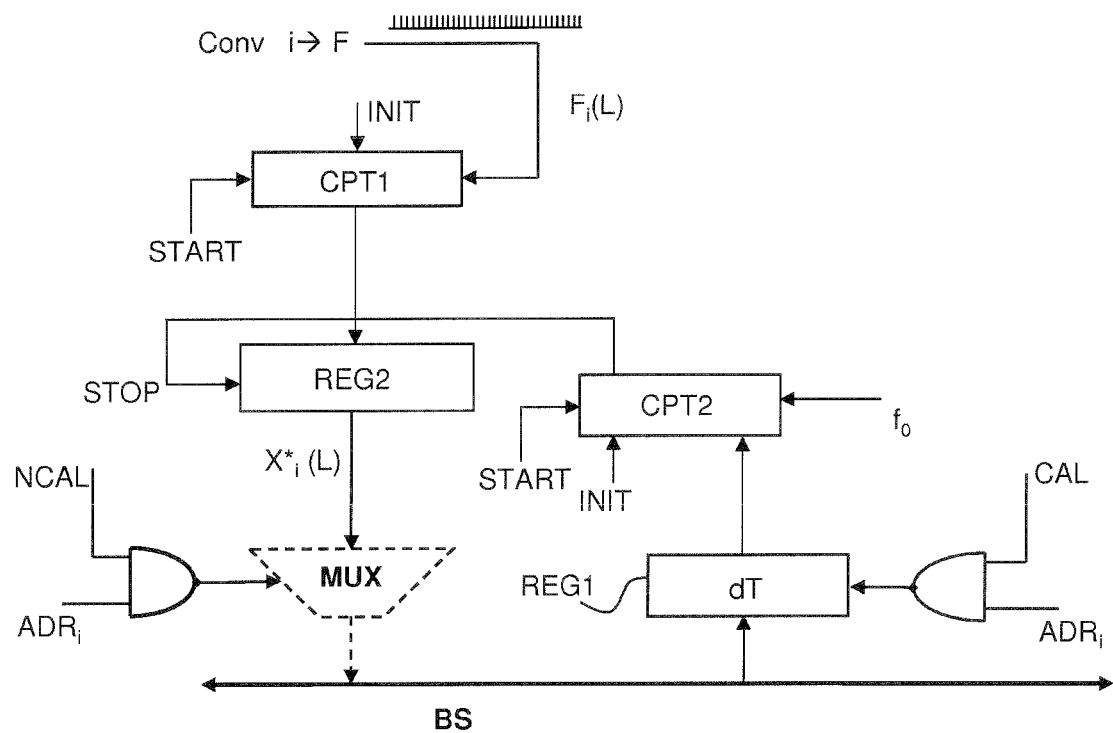
FIG. 5 represents a digital circuitry structure associated with a pixel, making it possible to establish a signal corrected by a multiplying coefficient.

FIG. 5 represents an example of such a multiplying correction circuit architecture associated with a pixel $P_i$ of the image-taking matrix. Only the digital portion of the pixel is represented, the analog portion is not. It is considered, by way of example, that the pixel comprises a bolometric detector, which is not represented, which supplies a current that depends on the illumination of the pixel, and this current is converted into a frequency $F_i$ by a current-frequency converter that is not represented. Thus, for a luminance L received by the pixel $P_i$, pulses at frequency $F_i(L)$ are emitted.

These pulses are transmitted to a first digital counter CPT1 which counts all the faster when the frequency $F_i(L)$ is higher. A second counter CPT2 receives counting pulses at fixed frequency $f_0$ to form a time base defining the light integration time on each cycle.

The two counters are initialized before the start of an integration cycle, by an edge of a signal INIT: the first counter CPT1 is initialized at zero, but the second is initialized at a value dT contained in an initialization register REG1. The counters begin to count simultaneously from an integration cycle START pulse. The first counter counts at the frequency $F_i(L)$; the second counts at the frequency $f_0$.

A second register REG2 receives the content of the first counter and stores it when it receives an end-of-counting pulse STOP from the second counter CPT2 when the latter returns to zero after having counted up to its maximum capacity. The content stored in the register REG2 during this cycle becomes all the greater when the first counter CPT1 has counted faster. It consequently depends on the counting frequency $F_i(L)$, in other words the light received by the pixel.

The content of the register REG2 is transmitted, at the end of the integration cycle, to an output bus BS, through a multiplexer MUX controlled by an addressing signal. The content is transmitted when the address $ADR_i$ of the pixel $P_i$ arrives via the address bus.

The content $dT_i$ of the register REG1 can be used to define, as stated hereinabove, a parameter that varies according to the sensitivity of the pixel; this parameter is, more specifically, a variable exposure time, used to modify the multiplying coefficient that must be applied to a pixel to bring the sensitivity of this pixel to a sensitivity equal to that of a reference pixel. The value of $dT_i$ can be zero for a pixel that has the weakest possible sensitivity, the posing time is then $T_0$, which is the time necessary for the counter CPT2 to count from zero up to its maximum capacity at a counting frequency $f_0$. If $dT_i$ is not zero, the exposure time is defined by $T_0-dT_i$, and the multiplying coefficient is $(T_0-dT_i)/T_0$.

The content $dT_i$ of the register REG1 is determined pixel by pixel by a computer that receives the signals obtained from all the pixels in a calibration operation; it is transmitted to the register REG1 via the bus BS. The calibration operation comprises the illumination of all the pixels by a screen of uniform luminance Lr. The calibration can be carried out either once, or several times, for example each time the sensor power supply is started up, or possibly periodically. This is why a calibration signal CAL maybe provided to authorize the transmission of a value $dT_i$ from the bus BS to the register REG1. A complementary signal NCAL can be used to validate the transmission to the output bus BS of a luminance signal value outside of the calibration operations. This luminance value is a value that is intrinsically corrected by the multiplying factor $(T_0-dT_i)/T_0$. It is therefore the corrected value $X^*_i(L)$ mentioned previously.

In this example, it has been assumed that the frequency $F_i$ established from the illumination of a pixel is referenced relative to the value of $K_0$ explained previously, that is to say a value common to all the pixels, for example zero for the zero luminance $L_0$.

It will therefore be understood that, in this example, the signal produced by a pixel is fundamentally the integral of a current during a time $T_0$ and that the multiplying correction factor is obtained by a modulation of the value of this integration time.

To determine the value $dT_i$ for each pixel during a calibration phase, it is possible to measure the signal obtained from the pixel during an integration time $T_0$ that is fixed for all the pixels, when all the matrix is illuminated by a uniform luminance Lr, and to calculate, according to the responses of the pixels, the correcting factor that must be applied to each pixel. This correcting factor can be determined, for example, relative to the average of the signals obtained by all the pixels illuminated by the luminance Lr, this average representing the equivalent of a reference pixel illuminated by the luminance Lr. From this individual correcting factor, $dT_i$ is obtained for each pixel, and $dT_i$ is stored in this pixel's register REG1.

However, it is also possible to consider that the reference luminance value is the average value received statistically by all the pixels at the end of a large number of images. It is then possible to observe the average value of the signal obtained from each pixel at the end of a large number of integration cycles, and the multiplying correction factor that must be applied is deduced therefrom, knowing $K_0$.

In the case where the multiplying correction factor is determined by an exposure time $T_0-dT_i$ that varies from pixel to pixel, it is also possible to determine $dT_i$ by a progressive recursive method, that does not use measurement, with the help of a screen of reference luminance.

The expression "recursive digital method" should be understood to mean a method of calculating a function $F_N(x_1, x_2, x_3, \ldots x_n, \ldots x_N)$ of N variables $x_n$ of rank n varying from 1 to N, wherein the starting point is a value $F_n$ found for this function by using the first n variables and the value $F_{n+1}$ is calculated for n+1 variables by a function of $F_n$ and the added variable $x_{n+1}$:

$$F_{n+1}=R(F_n, x_{n+1}).$$

Such a method progressively culminates in the calculation of $F_N$ and is not limited by the value of N since it can continue as and when N increases. In this case, the function $F_n$ is the content of the initialization register REG1 on the $n^{th}$ integration cycle. The variable $x_n$ is the signal value supplied in the $n^{th}$ cycle.

In practice, the procedure is as follows: on each image, the current content dT of the register is modified, to add to it a very small fraction $X_i(L)/2^p$ of the output signal of the pixel (the signal $X^*_i(L)$ is the signal after multiplying correction, it is therefore the signal present in the register REG2 in the architecture of FIG. 5). The signal $X_i(L)$ can be positive (luminance greater than the average for a reference pixel) or negative (luminance less than the average). dT is therefore increased a little if the signal is positive and reduced a little if the signal is negative.

Very progressively, with a time constant that becomes all the greater when $2^p$ is a large number, the content of the register REG1 will be stabilized at a value that is different for each pixel but which is such that all the pixels will supply a signal whose average is zero over a long period.

Figure 6:
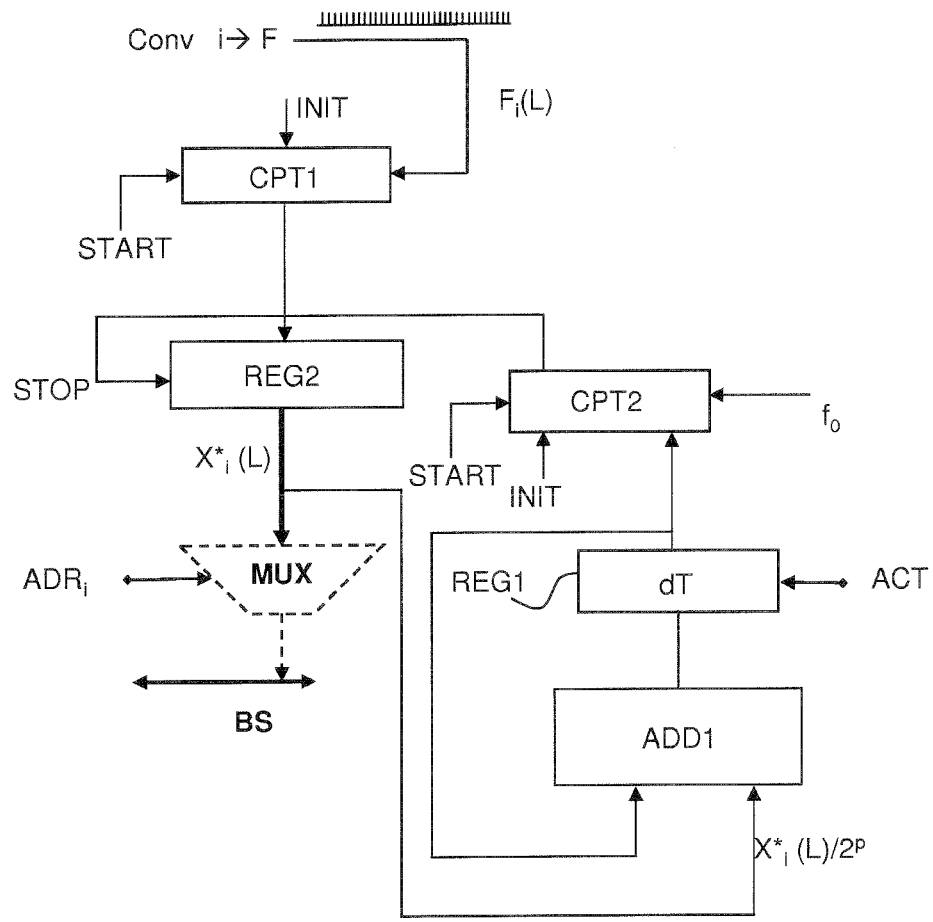
FIG. 6 represents a circuit making it possible to recursively establish the corrected signal by progressively incrementing or decrementing the content of a register according to the signal obtained from the pixel.

This principle of progressive generation of the content of the register REG1 can be implemented using an architecture like that of FIG. 6. In this architecture, there is no calibration phase because the calibration is done automatically and progressively as and when the pixels statistically receive illuminations that are highly variable but center around an average luminance that is identical for all.

Compared to FIG. 5, the calculation circuit of FIG. 6 further includes an adder ADD1 to add, after each cycle, a value $X^*_i(L)/2^p$ to the current content of the register. A signal ACT defines the incident of this addition at the end of a cycle or at the start of the next cycle. A value $X^*_i(L)/2^p$ is obtained by right-shifting the bits of the digital value $X^*_i(L)$ by p ranks.

The above text has considered an example of multiplying correction in the case of a pixel whose signal is obtained from a pulse count at a frequency that becomes all the higher as the illumination increases.

It will be understood that the invention can also be applied to other cases and mention has been given hereinabove to the possibility of doing it in analog mode with a voltage or bias current that is controlled individually for each pixel in an architecture in which the sensitivity of the pixel is proportional to this current or this bias voltage, which is generally the case in bolometric-type detector structures.

The invention claimed is:

1. A method of correcting sensitivity for a matrix image sensor, comprising the following steps:
   a signal $X_i(L)$ is established pixel by pixel that corresponds to the illumination of a pixel $P_i$ by a luminance L;
   a fixed reference $K_0$ is defined for this signal, the value $K_0$ being chosen such that, for a given luminance $L_0$ the pixels all supply a signal $X_i(L_0)$ substantially equal to $K_0$;
   and a corrected signal $X^*_i(L)$ is established by applying to a signal $X_i(L)-K_0$ referenced with respect to $K_0$ a multiplying correcting coefficient specific to the pixel concerned and by adding $K_0$ to the result of the multiplication, the correcting coefficient being determined from a signal $X_i(Lr)$ supplied by the pixel $P_i$ for a determined reference luminance Lr which is the same for all the pixels.

2. The method as claimed in claim 1, wherein the multiplying correcting coefficient is equal to $[X_0(Lr)-K_0]/[X_i(Lr)-K_0]$, in which $X_0(Lr)$ is a desired value for the corrected signal obtained from a pixel when it is illuminated by the reference luminance Lr.

3. The method as claimed in claim 2, wherein the signal $X_i(L)$ is the temporal integral of an electrical current value that becomes all the greater as the luminance increases.

4. The method as claimed in claim 3, wherein the multiplying correcting coefficient specific to each pixel is applied in the form of an electrical current integration time that differs from one pixel to another.

5. The method as claimed in claim 2, wherein the multiplying correcting coefficient is calculated for each pixel during a calibration phase during which the pixels are illuminated by a uniform light source of luminance Lr.

6. The method as claimed in claim 2, wherein each pixel comprises a light-sensitive element supplying a current that varies according to the illumination, a current-frequency conversion element producing pulses with a frequency that varies according to the current, and a pulse counter actuated during said integration time, the multiplying correcting coefficient being the ratio between this integration time and a fixed time $T_0$.

7. The method as claimed in claim 6, wherein the variable integration time specific to a pixel is defined from a register specific to the pixel, the content of this register being incremented by a value $X^*_i(L)/2^p$ on each integration cycle, p being an integer number at least equal to 8 and preferably chosen between 12 and 14, the corrected value $X^*_i(L)$ being able to assume positive or negative values around a zero value corresponding to the average of the luminances received by the pixels over a long time period.

8. The method as claimed in one of claims 1, wherein the signal $X_i(L)$ is the temporal integral of an electrical current value that becomes all the greater as the luminance increases.

9. The method as claimed in claim 8, wherein the multiplying correcting coefficient specific to each pixel is applied in the form of an electrical current integration time that differs from one pixel to another.

10. The method as claimed in claim 9, wherein the multiplying correcting coefficient is calculated for each pixel during a calibration phase during which the pixels are illuminated by a uniform light source of luminance Lr.

11. The method as claimed in claim 9, wherein each pixel comprises a light-sensitive element supplying a current that varies according to the illumination, a current-frequency conversion element producing pulses with a frequency that varies according to the current, and a pulse counter actuated during said integration time, the multiplying correcting coefficient being the ratio between this integration time and a fixed time $T_0$.

12. The method as claimed in claim 11, wherein the variable integration time specific to a pixel is defined from a register specific to the pixel, the content of this register being incremented by a value $X^*_i(L)/2^p$ on each integration cycle, p being an integer number at least equal to 8 and preferably chosen between 12 and 14, the corrected value $X^*_i(L)$ being able to assume positive or negative values around a zero value corresponding to the average of the luminances received by the pixels over a long time period.

13. The method as claimed in claim 8, wherein the multiplying correcting coefficient is calculated for each pixel during a calibration phase during which the pixels are illuminated by a uniform light source of luminance Lr.

14. The method as claimed in claim 8, wherein each pixel comprises a light-sensitive element supplying a current that varies according to the illumination, a current-frequency conversion element pulses with a frequency that varies according to the current, and a pulse counter actuated during said integration time, the multiplying correcting coefficient being the ratio between this integration time and a fixed time $T_0$.

15. The method as claimed in claim 14, wherein the variable integration time specific to a pixel is defined from a register specific to the pixel, the content of this register being incremented by a value $X^*_i(L)/2^p$ on each integration cycle, p being an integer number at least equal to 8 and preferably chosen between 12 and 14, the corrected value $X^*_i(L)$ being able to assume positive or negative values around a zero value corresponding to the average of the luminances received by the pixels over a long time period.

16. The method as claimed in 1, wherein the multiplying correcting coefficient is calculated for each pixel during a calibration phase during which the pixels are illuminated by a uniform light source of luminance Lr.

17. The method as claimed in 1, wherein each pixel comprises a light-sensitive element supplying a current that varies according to the illumination, a current-frequency conversion element producing pulses with a frequency that varies according to the current, and a pulse counter actuated during said integration time, the multiplying correcting coefficient being the ratio between this integration time and a fixed time $T_0$.

18. The method as claimed in claim 17, wherein the variable integration time specific to a pixel is defined from a register specific to the pixel, the content of this register being incremented by a value $X^*_i(L)/2^p$ on each integration cycle, p being an integer number at least equal to 8 and preferably chosen between 12 and 14, the corrected value $X^*_i(L)$ being able to assume positive or negative values around a zero value corresponding to the average of the luminances received by the pixels over a long time period.

19. The method as claimed in claims 17, for bolometric-type infrared imaging.

* * * * *